United States Patent
Bjernetun et al.

(10) Patent No.: US 8,666,630 B2
(45) Date of Patent: *Mar. 4, 2014

(54) METHOD FOR INCREASING ACTIVE DURATION TIME OF AN AUTOMATIC FREEWHEELING FUNCTION IN A VEHICLE

(71) Applicant: Volvo Lastvagnar AB, Molnlycke (SE)

(72) Inventors: Johan Bjernetun, Molnlycke (SE); Anders Eriksson, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/710,558

(22) Filed: Dec. 11, 2012

(65) Prior Publication Data

US 2013/0116907 A1    May 9, 2013

Related U.S. Application Data

(63) Continuation of application No. 12/596,674, filed as application No. PCT/SE2007/000386 on Apr. 20, 2007, now Pat. No. 8,332,120.

(51) Int. Cl.
    *G06F 17/00*    (2006.01)
(52) U.S. Cl.
    USPC .......................................................... 701/93
(58) Field of Classification Search
    USPC ........................................ 701/93–98; 477/97
    See application file for complete search history.

(56) References Cited

U.S. PATENT DOCUMENTS

| 4,062,419 | A | 12/1977 | Kadota | |
|---|---|---|---|---|
| 4,632,205 | A * | 12/1986 | Lewis | 180/165 |
| 6,869,377 | B2 * | 3/2005 | Steen | 475/81 |
| 7,223,204 | B2 * | 5/2007 | Steen et al. | 477/97 |
| 7,946,954 | B2 * | 5/2011 | Eriksson et al. | 477/92 |
| 2004/0029683 | A1 * | 2/2004 | Steen | 477/115 |
| 2010/0063697 | A1 * | 3/2010 | Lindgren et al. | 701/59 |
| 2012/0065852 | A1 * | 3/2012 | Eriksson et al. | 701/54 |
| 2012/0101698 | A1 * | 4/2012 | Eriksson et al. | 701/53 |

FOREIGN PATENT DOCUMENTS

| DE | 102004017115 A1 | 10/2005 |
|---|---|---|
| JP | 61287827 A2 | 12/1986 |
| WO | 02092378 A1 | 11/2002 |
| WO | 2005084995 A1 | 9/2005 |

OTHER PUBLICATIONS

Supplementary European Search Report (Sep. 9, 2013) for corresponding European App. EP 07 74 8051.

* cited by examiner

*Primary Examiner* — Russell Frejd
(74) *Attorney, Agent, or Firm* — WRB-IP LLP

(57) ABSTRACT

A method for increasing active duration time of an automatic freewheeling function in a vehicle with cruise control and during a cruise control active period is provided. The function includes an arrangement for determining a vehicle set speed for when the function is allowed to he activated and an arrangement for calculating a predetermined allowable vehicle speed drop to a first under speed value below the vehicle set speed. The function is controlled based on the under speed value, m order to extend active duration time of the function.

12 Claims, 3 Drawing Sheets

METHOD FOR INCREASING ACTIVE DURATION TIME OF AN AUTOMATIC FREEWHEELING FUNCTION IN A VEHICLE

The present application is a continuation of U.S. application Ser. No. 12/596,674, filed Oct. 20, 2009, which issued as U.S. Pat. No. 8,332,120 on Dec. 11, 2012, which is the U.S. National Stage of PCT/SE2007/000386, filed Apr. 20, 2007.

BACKGROUND AND SUMMARY

The present invention relates to a method for increasing active duration time of automatic freewheeling function in a vehicle with a combustion engine, a transmission and a cruise control.

The present invention also relates to a computer program and computer program product both to be used with a computer for executing said method.

An automatic vehicle transmission designed from planetary gears usually has one-way couplings between the planetary gear steps, which, when a propulsion engine is in drive, lock in the automatic gear position for torque transmission from the engine to the drive wheels, but which, when torque is transmitted in the opposite direction, i.e. at zero throttle and with the vehicle in motion, disengage and cause the vehicle to freewheel without engine braking, which, by utilizing the kinetic energy of the vehicle, yields lower fuel consumption than if the engine is busy braking.

A corresponding freewheel function for automated mechanical transmissions (AMT) is shown in WO 2002/092378. Here, a freewheel function is obtained by putting a splitter gear disposed in the gearbox into its neutral position when an accelerator pedal disposed in the vehicle is located within a predetermined swivel angle range, which starts at a distance from the rest position f the pedal and extends over a slight angle within the total swivel angle of the pedal. When the driver wishes to change the driving condition from driving engine to allowing the vehicle to freewheel without engine braking, he lets up the accelerator pedal, so that it reaches the predetermined range when the drive from the engine is broken. If engine braking is required, the driver further releases the accelerator pedal, either fully or, in any event, to the point where it passes through the predetermined range within which disengagement occurs.

Another example of a prior art freewheel function is disclosed in WO 2005/084995. The freewheel function is automatically activated when a predetermined vehicle condition is prevailing. This condition comprises at least traveling in a not too steep downslope and that there is no fuel demand from the driver (via the accelerator pedal) or from a cruise control in the vehicle. When the freewheel function is activated with a certain vehicle set speed, i.e. during a time period when the cruise control is active, and a certain over speed limit (VBCC set speed) is exceeded, then the freewheel function is automatically inactivated and the vehicle is automatically braked to a speed under said VBCC set speed. When vehicle speed is below VBCC set speed the freewheel function will be activated again if the right vehicle conditions are still prevailing.

WO2005/084995 discloses that said VBCC set speed can be automatically adjusted in dependence of at least prevailing road gradient.

WO2005/084995 further discloses that said VBCC set speed can be automatically adjusted in dependence of road gradient, in the near future, e.g. in dependence of that the prevailing downhill slope will end in a near future, which means increased VBCC set speed in order to postpone inactivation of the freewheel function.

In certain downslopes where the vehicle travel resistance is approximately zero, arrangements according to prior art will not activate the freewheel function since a too short freewheel duration time is foreseen (calculated) for a certain vehicle set speed, thus an arrangement according to prior art needs a downslope with less travel resistance (in practice a steeper down slope) to initiate activation of the freewheel function.

The freewheel function cannot be activated during a too short duration time, due to fuel punishment. Another reason not to activate the freewheel function during a too short duration time is that travel comfort otherwise would decrease. in prior art arrangements hysteresis is used when travel resistance is approximately zero, which means that the vehicle needs to be accelerated (preferably without fuel injection) to a vehicle speed a bit above a vehicle set speed, before the freewheel function can be allowed to be reactivated. This will secure enough freewheel duration time.

It is desirable to solve the problem of how to extend the freewheel duration time further so that fuel savings can be increased even further and without decreased travel comfort.

The method according to an aspect of the invention is a method for increased freewheel active duration time during a cruise control active time period. With an increased freewheel duration time more fuel will be saved. The invention is especially beneficial/effective in downslopes with a relatively small inclination, i.e. where vehicle travel resistance is approximately zero.

The above mentioned problem is solved by manipulating the speed area within which the freewheel function is allowed to be activated. This can be done by a method where, said function comprises (includes, but is not necessarily limited to) means for determining a first vehicle set speed for when said function is allowed to be activated under at least prevailing conditions. This method is according to an aspect of the invention characterized in the steps of:

calculating a predetermined allowable vehicle speed drop to an under speed value below said first vehicle set speed for at least prevailing conditions and;

controlling said function based on said under speed value, in order to extend active duration time of said function.

Thus, the freewheel function duration time is extended by allowing a certain predetermined vehicle speed drop below said first vehicle set speed before the freewheel function is controlled. In one embodiment of the invention said controlling comprises the step of inactivating said freewheel function when vehicle speed has decreased down to said first under speed value from a vehicle speed above said under speed value. In another embodiment of the invention said controlling comprises the step of activating said freewheel function when vehicle speed has increased up to said first under speed value from a vehicle speed below said under speed value. Thus, if vehicle speed is approaching the under speed value, through retardation and the freewheel function is currently activated, it will be inactivated when the under speed value is reached. On the other hand if vehicle speed is approaching the under speed value through acceleration, i.e. the freewheel function is currently inactive, it will be activated when the under speed value is reached.

In one embodiment of the invention the same effect can be achieved by simply move the first vehicle set speed to a second vehicle set speed with a lower vehicle speed value, thus said second vehicle set speed is equal in functionality to said vehicle under speed value.

In one embodiment of the invention the determination of the magnitude of the allowed predetermined vehicle speed drop to said under speed value below said first vehicle set speed is dependent on the vehicle's possibilities to be able to accelerate up to said first vehicle set speed from said under speed value within a reasonable predetermined time. Thus, the allowed vehicle speed drop can be adapted to prevailing vehicle load and available propulsion power.

In another embodiment of the invention said predetermined vehicle speed drop below said first vehicle set speed will not occur if the vehicle is expected to meet increased travel resistance, for example an uphill slope, in the near future. The advantage of this embodiment is a better uphold of vehicle average speed and under most circumstances also a lower total fuel consumption.

In a further embodiment of the invention the magnitude of said vehicle under speed value will not be lower than that of a highest gear of a gearbox in the vehicle, or a gear engaged just before the freewheel function was activated, will be possible to reengage when the vehicle speed reaches said vehicle under speed value and the freewheel function will be inactivated and a gear will have to be engaged.

In a further embodiment of the invention the vehicle under speed value can be manually set for at least one first vehicle set speed by the driver.

In another embodiment of the invention the vehicle under speed value can be set for one or several different first vehicle set speeds by a manufacturer of the vehicle or authorized workshop personnel.

In a further embodiment of the invention when the vehicle is driven with a vehicle speed below said vehicle under speed value and the freewheel function is currently inactivated, the freewheel function will be activated when said vehicle under speed is reached due to vehicle acceleration through the force of gravity. This can happen for example when the vehicle passes a crest.

BRIEF DESCRIPTION OF THE DRAWING

The present invention will be described in greater detail below with reference to the accompanying drawings which, for the purpose of exemplification, shows further preferred embodiments of the invention and also the technical background, and in which.

DETAILED DESCRIPTION

In one embodiment of the invention the vehicle comprises a propulsion unit with an output shaft connected to driven wheels of the vehicle via a transmission arranged for gear ratio change between said propulsion unit and said driven wheels. The propulsion unit can be a combustion engine or a hybrid comprising for example a combustion engine and an electric motor/generator. The transmission can be a stepped gear transmission, for example an AMT or Dual Clutch Transmission (DCT), comprising a freewheel function allowing the vehicle to freewheel during certain predetermined vehicle conditions in order to save fuel as mentioned above, and as known in prior art.

The propulsion unit and, the transmission forms a drive train of the vehicle. The drive train preferably comprises one or several control units for controlling different functions of the drive train as known in the art. The vehicle also comprises a cruise control, which as such is known art. The freewheel function according to the invention is preferably active during a cruise. control active period.

Figure 1:
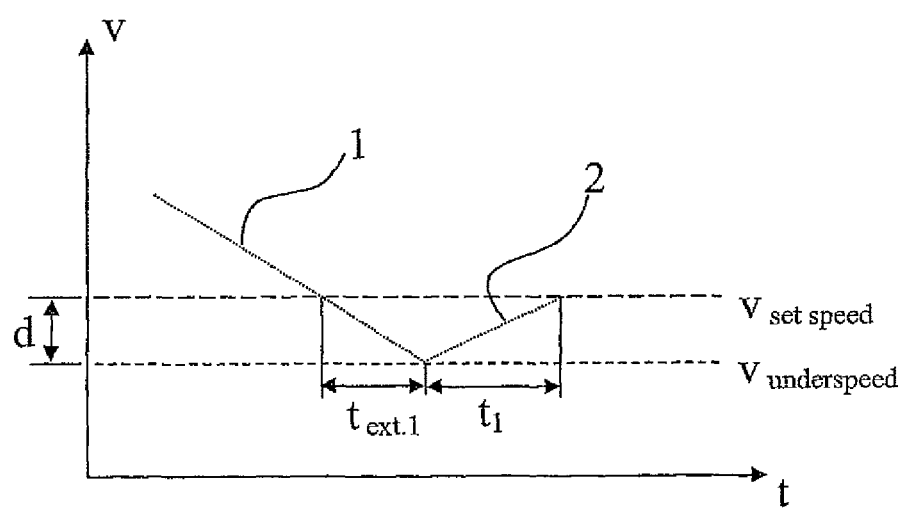
FIGS. 1 and 2 show diagrams over how the freewheel activation time can be extended according to different embodiments of the invention.

Such a control unit can be programmed to determine a first vehicle set speed Vset speed for when said freewheel function is allowed to be activated under at least prevailing vehicle conditions. Preferably said Vset speed can also be set speed for said cruise control. FIG. 1 shows a diagram with vehicle speed v at the y-axis and time t at the x-axis. Said first vehicle set speed Vset speed is plotted as a horizontal dotted line for a chosen vehicle speed. This is known art and is done by means for determining said first vehicle set speed. As mentioned above, in connection to WO 2005/084995, the freewheel function can further comprise an upper maximum allowable vehicle freewheeling speed VBCC set speed (brake cruise set speed, not shown in figures). It should be noted that the function connected to VBCC set speed and as shown in WO 2005/084995 is not necessary for the embodiments of the present invention, but can be a good complement.

According to the invention the control unit is further programmed to calculate a predetermined allowable vehicle speed drop to a first under speed value Vunderspeed below said first vehicle set speed Vset speed for at least the prevailing vehicle conditions and the control unit is further programmed to perform controlling of said freewheel function based on said under speed value. The advantage is extended active duration time of said freewheel function. In FIG. 1 reference text.i indicates the extended part of the freewheel activation time, which is the beneficial contribution of the present invention over prior art. The under speed value Vunderspeed is plotted as a horizontal dotted line below said first vehicle set speed in the FIG. 1. When the freewheel function is activated and the travel resistance of the vehicle is such that the vehicle speed is decreasing, as shown by curve 1 in FIG. 1, said control unit is according to the invention programmed to allow a predetermined vehicle speed drop d down to said Vunderspeed. When the vehicle speed indicated by curve 1 hits the Vunderspeed the control unit is programmed to initiate a controlling action, which in a vehicle condition comprising vehicle speed retardation with the freewheel function activated, comprises at least the step of inactivating said freewheel function. Inactivation of the freewheel function means engaging a gear in the transmission and drivingly connecting the propulsion unit to the driven wheels. In a preferred embodiment of the invention the control unit can be programmed to automatically increase vehicle speed up to at least said Vset speed, as indicated by the increasing vehicle speed curve 2 in FIG. 1, by drive train control.

The difference d between said Vset speed and Vunderspeed is said allowable predetermined vehicle speed drop. in one embodiment of the invention the control unit is programmed to calculate the magnitude of said allowed predetermined vehicle speed drop d (and thus Vunderspeed) in dependence of the vehicle's possibilities to be able to accelerate up to said first vehicle set speed Vset speed from said first under speed value Vunderspeed within a reasonable predetermined time ti as indicated in FIG. 1 (see curve 2). If the vehicle is expected to meet relatively high travel resistance the control unit is programmed to decrease the maximum allowable vehicle speed drop d by increasing the Vunderspeed. Thus, the time ti will be decreased. There are several different methods known in the art for estimating current or future vehicle travel resistance.

In another embodiment of the invention the control unit can be programmed to determine the difference d (or the magnitude of Vunderspeed) by not allowing the Vunderspeed to be lower than that a highest gear of said transmission or a gear engaged just before the freewheel function was activated, will be possible to reengage when the vehicle speed reaches said Vunderspeed and the freewheel function will be inactivated and a gear will have to be engaged. This method to decide magnitude of Vunderspeed can be combined with the method mentioned above using time ti. The method that gives the highest vehicle speed value determines Vunderspeed.

Besides the above described embodiments with automatic determination of the Vunderspeed for a certain Vset speed and vehicle condition there can also be embodiments of the invention where the Vunderspeed can be manually set for at least one Vset speed by the driver. This can be done with different kinds of driver/vehicle interface for controlling said freewheel function arranged in the vehicle. In another embodiment of the invention the Vunderspeed can be factory-set for one or several different Vset speed or set by authorized workshop personnel.

According to one embodiment of the invention said predetermined vehicle speed drop d will not occur if the vehicle is expected to meet increased travel resistance in the near future. Predicting future travel resistance can be done by for example, continuously monitoring the future topography both during the time the freewheel function is inactive and when it is active.

Figure 2:
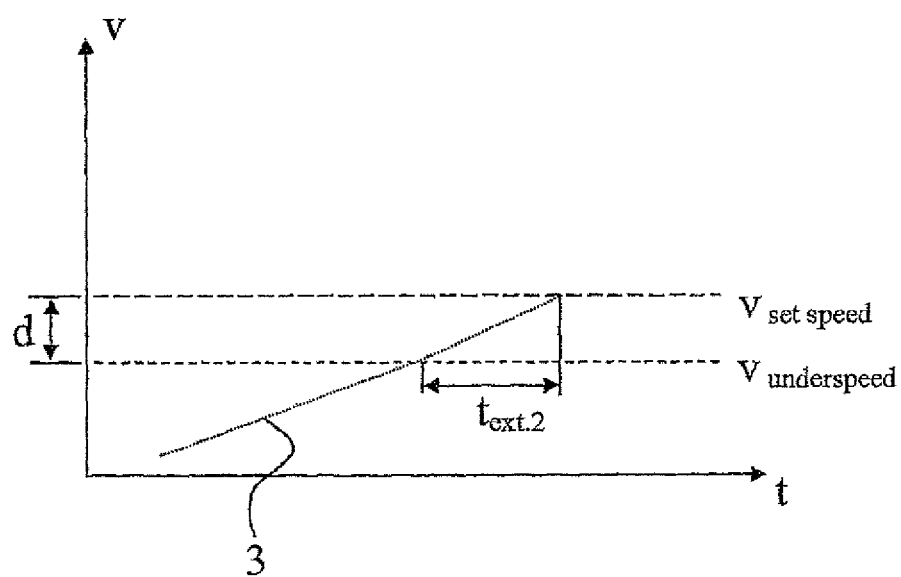

FIG. 2 shows the same diagram with Vunderspeed and Vset speed as in FIG. 1, thus d in FIG. 2 can be determined in the same way as in the embodiments discussed above in connection to FIG. 1. The only difference is that vehicle speed is approaching Vunderspeed from below and the freewheel function is inactive instead of active before the time of reaching Vunderspeed. This is indicated by the increasing vehicle speed curve 3 in FIG. 2. According to one embodiment of the invention said control unit is programmed to perform controlling of said freewheel function based on said under speed value Vunderspeed, by activating said function when the vehicle speed has increased up to said Vunderspeed from a vehicle Speed below the Vunderspeed/ as indicated with curve 3, The activation of the freewheel function is initiated when the control unit recognizes a certain predetermined vehicle condition. This condition occurs when the vehicle;
  has a speed below said Vunderspeed
  the freewheel function is currently inactivated,
  the vehicle is passing for example a crest
  and the control unit estimates that the Vunderspeed will be reached due to vehicle acceleration through gravity when the crest has been passed.

Thus, the control unit comprises means known in prior art for estimating/recognizing future topology (travel resistance) and calculating future vehicle speed.

The main advantage with the embodiments described in connection to FIG. 2 is indicated by the reference text.2 in FIG. 2 which indicates the extended pan of the freewheel activation time, which is the beneficial contribution of the present invention over prior art.

As for the embodiments explained through FIG. 2 the magnitude of in relation to a certain Vset speed can be determined in the same manner as described above for the embodiments described in connection to FIG. 1.

In another embodiment of the invention said Vunderspeed can be defined as a second vehicle set speed. This can be used in all previously mentioned embodiments.

In all mentioned embodiments of the invention the control unit can be programmed to foresee (calculate) possible future freewheel duration time for a certain vehicle set speed. In this way a further parameter can be used to decide if said freewheel function can be activated or not. To calculate possible freewheel duration time in advance is known as such and mentioned above. In addition and also (mentioned above) known as such, a hysteresis based function can be used in combination with the embodiments of the invention mentioned above, which means that the vehicle needs to be accelerated (preferably without fuel injection) to a vehicle speed a bit above said vehicle under speed (or alternatively vehicle set speed), before the freewheel function can be allowed to be reactivated. This will secure enough freewheel duration time.

Figure 3:
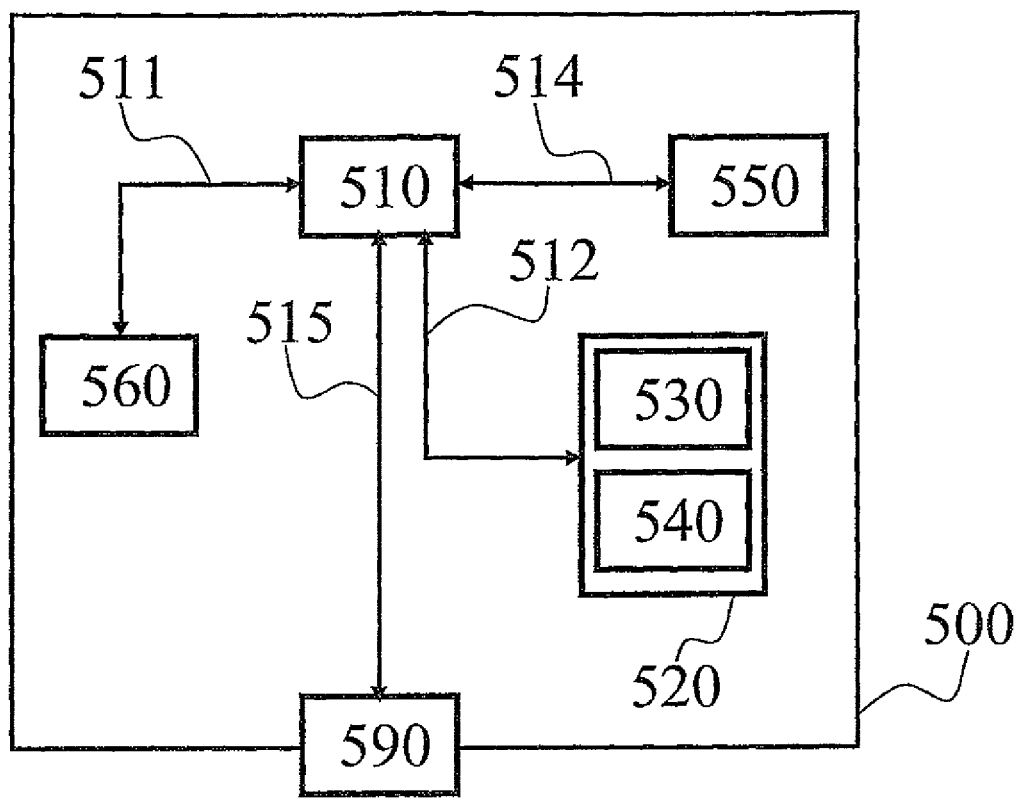
FIG. 3 shows a computer arrangement for the invention.

Thus, as indicated above it should be understood that there can be several different Vset speed and there can also be several different Vunderspeed determined for the several Vset speed respectively, either automatically or manually or both ways, FIG. 3 shows an apparatus 500 according: to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the above mentioned control unit programmed with the inventive functions. The data processing unit 510 can comprise, for example, a microcomputer.

The memory 520 also has a second memory part 540, in which a program for controlling the freewheel function according to the invention is stored. In an alternative embodiment, the program for controlling the freewheel function is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the 540 or the program stored in the nonvolatile recording medium 550.

The invention should not be deemed to be limited to the embodiments described above, but rather a number of further variants and modifications are conceivable within the scope of the following patent claims.

The invention claimed is:

1. Method for increasing active duration time of an automatic freewheeling function in a vehicle with cruise control comprising
  during a cruise control active period
    setting a first vehicle set speed above which the function is allowed to be activated under at least prevailing, conditions;
    establishing a first under speed value to which vehicle speed is allowed to drop below the first vehicle set speed for at least prevailing conditions;
    controlling the function based on the under speed value, in order to extend active duration time of the function, wherein the magnitude of the vehicle under speed value will not be lower than that of a highest gear of a transmission in the vehicle, or a gear engaged just before the freewheel function was activated, and will be possible to reengage when the vehicle speed reaches the vehicle under speed value and the freewheel function will be inactivated and a gear will have to be engaged.

2. Method as claimed in claim 1, wherein controlling the function comprises inactivating the function when vehicle speed has decreased down to the first under speed value from a vehicle speed above the under speed value and when the function is active.

3. Method as claimed in claim 1, wherein the predetermined vehicle speed drop will not occur if the vehicle is expected to meet increased travel resistance in the near future.

4. Method as claimed in claim 1, wherein controlling the function comprises activating the function when vehicle speed has increased up to at least the first under speed value from a vehicle speed below the under speed value and when the function is inactive.

5. Method as claimed in claim 4, wherein a force of gravity is a main contributor to the vehicle speed increase.

6. Method as claimed in claim 1, wherein the the first under speed value is established as a function of the vehicle's ability to be able to accelerate up to the first vehicle set speed from the first under speed value within a predetermined time.

7. Method as claimed in claim 1, wherein the vehicle under speed value is manually set for at least one first vehicle set speed by the driver.

8. Method as claimed in claim 1, wherein the vehicle under speed value is factory-set for one or several different first vehicle set speeds or set by authorized workshop personnel.

9. Method as claimed in claim 1, wherein the first under speed value is defined as a second vehicle set speed.

10. A non-transitory computer readable medium comprising a computer program comprising a program code for executing a method for increasing active duration time of an automatic freewheeling function in a vehicle with cruise control comprising during a cruise control active period
setting a first vehicle set speed above which the function is allowed to be activated under at least prevailing conditions;
establishing a first under speed value to which vehicle speed is allowed to drop below the first vehicle set speed for at least prevailing conditions;
controlling the function based on the under speed value, in order to extend active duration time of the function, wherein the magnitude of the vehicle under speed value will not be lower than that of a highest gear of a transmission in the vehicle, or a gear engaged just before the freewheel function was activated, and will be possible to reengage when the vehicle speed reaches the vehicle under speed value and the freewheel function will be inactivated and a gear will have to be engaged.

11. A non-transitory computer program product comprising a program code for executing a method for increasing active duration time of an automatic freewheeling function in a vehicle with cruise control comprising during a cruise control active period
setting a first vehicle set speed above which the function is allowed to be activated under at least prevailing conditions;
establishing a first under speed value to which vehicle speed is allowed to drop below the first vehicle set speed for at least prevailing conditions;
controlling the function based on the under speed value, it order to extent active duration time of the function, wherein the magnitude of the vehicle under speed value will not be lower than that of a highest gear of a transmission in the vehicle, or a gear engaged just before the freewheel function was activated, and will be possible to reengage when the vehicle speed reaches the vehicle under speed value and the freewheel function will be inactivated and a gear will have to be engaged.

12. A computer comprising a computer program loaded on a non-transitory memory in the computer, the computer program comprising program code for executing a method for increasing active duration time of an automatic freewheeling function in a vehicle with cruise control comprising during a cruise control active period
setting a first vehicle set speed above which the function is allowed to be activated under at least prevailing conditions;
establishing a first under speed value to which vehicle speed is allowed to drop below the first vehicle set speed for at least prevailing conditions;
controlling the function based on the under s d value in order to extend active duration time of the function, wherein the magnitude of the vehicle under speed value will not be lower than that of a highest gear of a transmission in the vehicle, or a gear engaged just before the freewheel function was activated, and will be possible to reengage when the vehicle speed reaches the vehicle under speed value and the freewheel function will be inactivated and a gear will have to be engaged.

* * * * *